R. M. AUSTIN.
HEATING APPLIANCE.
APPLICATION FILED DEC. 4, 1909.
1,013,267.
Patented Jan. 2, 1912.
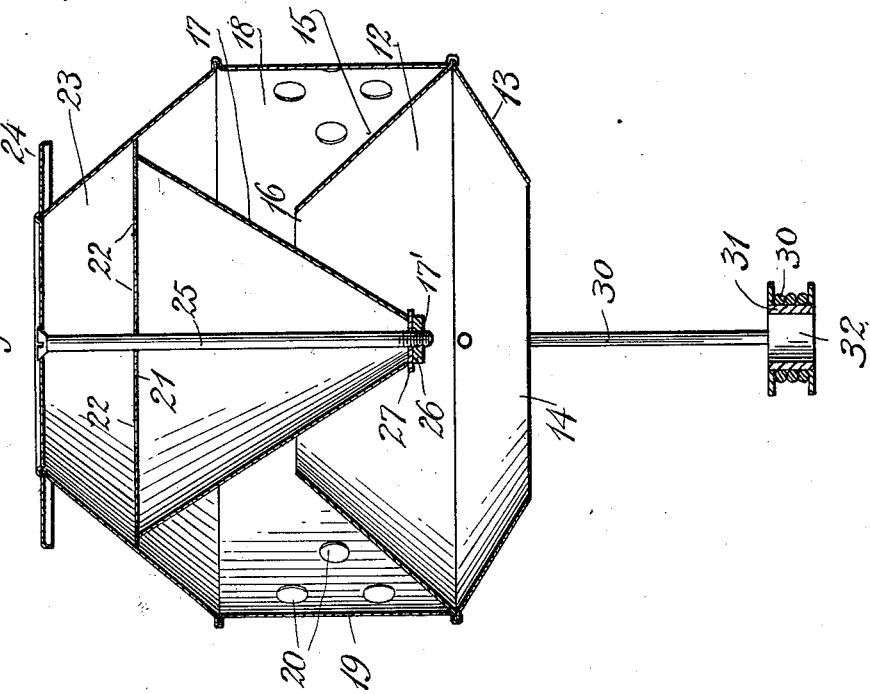
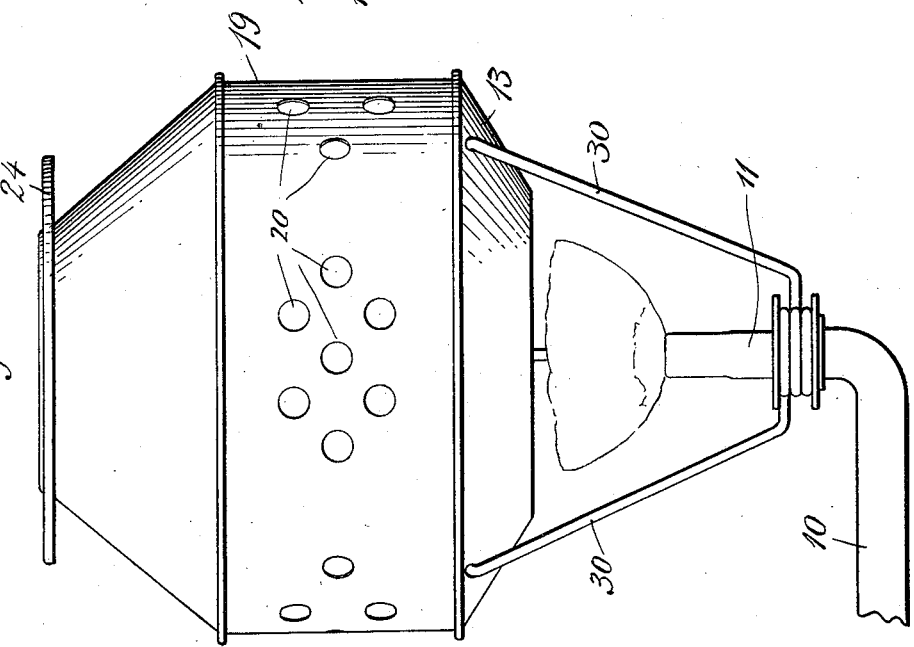
WITNESSES:
Louis Lucia.
M. E. O'Neill.
INVENTOR.
R. M. Austin,
BY Chas. F. Schmelz
ATTORNEY.

UNITED STATES PATENT OFFICE.

ROBERT M. AUSTIN, OF HARTFORD, CONNECTICUT, ASSIGNOR TO THE AUSTIN MANUFACTURING AND SUPPLY COMPANY, OF HARTFORD, CONNECTICUT, A CORPORATION OF CONNECTICUT.

HEATING APPLIANCE.

1,013,267.  Specification of Letters Patent.  Patented Jan. 2, 1912.

Application filed December 4, 1909. Serial No. 531,304.

*To all whom it may concern:*

Be it known that I, ROBERT M. AUSTIN, a citizen of the United States, and resident of Hartford, in the county of Hartford and State of Connecticut, have invented certain new and useful Improvements in Heating Appliances, of which the following is a full, clear, and exact specification.

This invention relates to heating appliances, and more especially to that class thereof which may be attached to gas burners or similar devices so as to concentrate the heat generated by the gas flame into a device whereby not only the several component elements thereof may be heated themselves but whereby also air will be heated to a high degree and distributed in all directions.

The invention has for one of its objects the provision of such a device whereby hot air will be thrown out from the heating drum as fast as the heat generation takes place, and in which fresh or cold air is constantly supplied and conducted into the heating drum by the exit of the heated air therefrom, so that practically a constant stream of hot air will issue from the heating drum which latter is provided with apertures whereby the hot air will be permitted to escape laterally of the device and the best results will, therefore, be achieved.

The invention has, furthermore, for its object the provision of a device in which a certain volume of "dead air" will be heated to a high degree and may thus become efficient in heating a plate which may be utilized for warming vessels of various descriptions without any danger of being burned and in fact while the latter are entirely kept free from contact with the gas flame.

The invention has been clearly illustrated in the accompanying drawings in which—

Figure 1 is a side view of my improved device mounted on the gas burner of a well known construction, and Fig. 2 is a central vertical section thereof.

Referring to the drawings, the numeral 10 denotes a gas pipe having a nipple 11 upon which the heater forming the subject matter of the present invention may be placed. The heater itself comprises a concentrating chamber 12 consisting of a lower section 13 which is open on the bottom as at 14 of such size as to encompass the full extent of the gas flame issuing from the burner 11. By referring to Fig. 2 it will be seen that the section 13 is flaring outwardly from the bottom opening so as to increase the area of the chamber 12 which is subsequently again reduced toward the top by the upper section 15 thereof, this section having an opening 16 at its top very slightly larger than the heating drum 17 at that particular point, and so as to leave a comparatively small annular space through which the heated air accumulated in the concentrating chamber 12 can pass into the radiating drum 18. The heating drum 17 is of inverted cone shape and projects into the concentrating drum 12, so that its lower point or apex 17' will receive the full benefit of the heat generated by the gas flame, and that, furthermore, the conical wall of the heating drum will act as a deflector-plate whereby the heat of the gas flame will be conducted directly into the radiating drum 18, it being understood that the heating drum top is the particular metallic medium which is directly exposed to the heat of the gas flame. It will, therefore, be seen that the heat generated by the gas flame will result in heating the heating drum to a very high degree, and that, furthermore, the hot air rising through the aperture 16 will naturally carry with it a current of air entering through the aperture 14 of the concentrating drum, so that for this reason the hot air entering the radiating drum will be replaced by fresh air which is by virtue of the drum 17 again heated to a high degree before it enters the radiating drum 18. This radiating drum 18 comprises a cylindrical shell 19 having perforations 20 through which the hot air is forced out and spread in all directions, and it is this particular result which renders my improved heating device of especial efficiency.

By referring to Fig. 2 it will be seen that the upper end of the heating drum or cone 17 is closed by a plate 21 which may be provided with perforations 22 to vent said drum and also to permit the heat generated inside the said heating drum 17 to pass into the upper portion 23 thereof, the latter serving as a reserve heater which carries at its upper end or top a plate 24 adapted to receive utensils of various kinds which it is desired to heat. Likewise, it will be seen that by virtue of the construction shown there is no possibility of the flame coming into direct contact with said plate, so that all danger of burning the utensil or the contents thereof will be avoided.

The parts above described are made independently of each other but are assembled and held together by means of a rod 25 screw threaded at its lower end and having a nut and washer 26, 27, respectively, whereby the top plate 24, the upper dome of the radiating drum 18, and the heating drum 17 will be held together.

Various means may be employed for supporting my improved heating appliance on the burner, and in the present instance the organization is such that the device is supported above the flame in such a manner as not to interfere with the light of the flame. In other words, in the present instance the light can be used, while at the same time the heat generated by the flame is taken advantage of in imparting a high degree of temperature to the air and also distributing it in all directions.

In the form illustrated in Figs. 1 and 2 my improved heating device is supported on a gas burner or bracket by a series of arms 30, the upper ends of which are bent to enter apertures provided therefor in the lower sections 13 of the concentrating drum; while the lower ends of said rods 30 are bent around a thimble 31 having an aperture 32 which is adapted to fit over the burner 11.

Many changes may be made in the device above described and shown in the drawings, without departing from the spirit of the invention, which is not by any means confined to any particular manner of supporting the device on a burner, since the apparatus may be just as well applied to and supported on, the chimney of an ordinary oil lamp in which case the holding means must necessarily be modified to meet the requirements.

I claim:—

1. A heating appliance comprising a concentrating chamber open at its top and bottom, a heating drum provided with a top plate projecting into the top of said concentrating chamber, and so as to leave an annular space between the walls of said concentrating chamber and the heating drum to permit the escape of hot air, and a radiating drum surrounding said concentrating chamber and the heating drum, and having perforations to permit the escape of hot air therefrom.

2. The combination with a radiating drum, of a heating drum, and means for securing the same together, a concentrating chamber partially surrounding said heating drum and also carried by said radiating drum, and means carried by said concentrating chamber for supporting the latter on a gas bracket, said means comprising a series of rods extending downwardly from said concentrating chamber, and a thimble adapted to fit on the gas bracket and in engagement with the lower ends of said rod.

3. The combination with a radiating drum, having a conical top, a plate disposed within said conical top, a heating drum in engagement with and closed by said plate, means for securing the radiating drum and heating drum together, and the concentrating chamber carried on the lower end of the radiating drum.

4. The combination with a radiating drum, having a conical top, a plate disposed within said conical top, a heating drum in engagement with and closed by said plate, means for securing the radiating drum and heating drum together, and the concentrating chamber carried on the lower end of the radiating drum, and a plate carried by and at the top of the conical portion of a radiating drum, and means for securing the radiating drum, plate and heating drum together.

ROBERT M. AUSTIN.

Witnesses:
CHAS. F. SCHMELZ,
M. O'NEILL.

---

Copies of this patent may be obtained for five cents each, by addressing the "Commissioner of Patents, Washington, D. C."